(12) United States Patent
Cherukuri et al.

(10) Patent No.: US 6,174,514 B1
(45) Date of Patent: *Jan. 16, 2001

(54) BREATH FRESHENING CHEWING GUM WITH ENCAPSULATIONS

(75) Inventors: Subraman R. Cherukuri, Vienna, VA (US); Amrik L. Khurana, Granada Hills, CA (US); Martin K. Schaller, Jr., Fairfax, VA (US); Tommy L. Chau, Ashburn, VA (US); Matthew J. Strait, Arlington, VA (US)

(73) Assignee: Fuisz Technologies Ltd., Chantilly, VA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/290,317

(22) Filed: Apr. 12, 1999

(51) Int. Cl.⁷ .............................. A61K 9/68; A61K 9/50; A61K 9/14; A61K 9/52
(52) U.S. Cl. ..................... 424/48; 424/440; 424/489; 424/490; 426/3; 426/5
(58) Field of Search ....................................... 424/48, 440

(56) References Cited

U.S. PATENT DOCUMENTS

| | | | |
|---|---|---|---|
| 3,137,631 | * 6/1964 | Soloway . | |
| 3,495,988 | * 2/1970 | Balassa . | |
| 3,911,099 | * 10/1975 | DeFoney et al. . | |
| 4,597,959 | * 7/1986 | Barr . | |
| 4,626,427 | 12/1986 | Wienecke et al. | 424/35 |
| 4,689,214 | 8/1987 | Niles et al. | 424/49 |
| 4,767,615 | * 8/1988 | Gehu et al. . | |
| 4,814,163 | 3/1989 | Barth | 424/49 |
| 4,963,369 | * 10/1990 | Song et al. . | |
| 5,009,893 | 4/1991 | Cherukuri et al. | 424/440 |
| 5,128,155 | 7/1992 | Song et al. | 426/5 |
| 5,154,927 | * 10/1992 | Song et al. . | |
| 5,164,195 | * 11/1992 | Lew . | |
| 5,286,496 | * 2/1994 | Stapler et al. . | |
| 5,300,305 | * 4/1994 | Stapler et al. . | |
| 5,364,634 | * 11/1994 | Lew . | |
| 5,370,864 | * 12/1994 | Peterson et al. . | |
| 5,382,424 | * 1/1995 | Stapler et al. . | |
| 5,549,917 | 8/1996 | Cherukuri et al. | 426/96 |
| 5,556,652 | 9/1996 | Cherukuri et al. | 426/5 |
| 5,629,035 | 5/1997 | Miskewitz | 425/5 |
| 5,639,470 | 6/1997 | Ishibashi et al. | 424/439 |
| 5,820,822 | * 10/1998 | Kross . | |

FOREIGN PATENT DOCUMENTS

| | | | |
|---|---|---|---|
| 3610179A1 | 10/1986 | (DE) . | |
| 3733742C1 | 3/1989 | (DE) . | |
| 0 537 919 A1 | 9/1992 | (EP) | A23G/3/30 |
| WO 84/03201 | 8/1984 | (WO) | A23G/3/30 |
| WO 99/13734 | 3/1999 | (WO) | A23G/3/30 |

* cited by examiner

*Primary Examiner*—Shep K. Rose
(74) *Attorney, Agent, or Firm*—John F. Levis; Richard D. Schmidt

(57) ABSTRACT

A chewing gum composition for instant and extended release breath freshening has a gum base, at least one wetting agent, at least one immediate release flavor ingredient, and at least on encapsulation. The encapsulations include flavor encapsulations, metallic ion encapsulations, and organic substance encapsulations.

25 Claims, 3 Drawing Sheets

BREATH FRESHENING CHEWING GUM WITH ENCAPSULATIONS

FIELD OF THE INVENTION

The present invention relates to a chewing gum composition, and more particularly, to a breath freshening chewing gum with encapsulated flavors and actives having both instant and long range breath freshening capacity. The invention also relates to breath-freshening encapsulations for use with various confectionery carriers.

BACKGROUND OF THE INVENTION

Malodorous breath has been a personal hygiene issue for many years. Food particles and other matter which linger in the area of the mucous membranes and between the teeth and gums contribute significantly to this odor problem. Another primary cause of bad odor are the emanaton of various sulfur compounds from the body. Sulfur is generated in the digestive tract as a result of the breakdown of various high-sulfur foods, and is released from the body through the mouth and pores of the individual. Certain food substances, such as garlic and onions, are notorious for generating the sulfur compounds which cause the foul odor. Garlic eaters typically note a considerable amount of belching and burping for several hours after consumption. As the garlic is digested in the abdominal tract, bursts of gas are generated, and with it comes a rather disagreeable smell. With each release of air from the stomach comes a noticeable amount of disagreeable smell as the garlic is dissolved in the digestive tract. Other substances such as tobacco and alcohol also affect a person's oral hygiene as these substances tend to linger around the mucous membranes inside the mouth.

Currently, much breath freshening technology provides freshening protection up to about 30 minutes or so in the mouth. Candies or mints are dissolved by the user to mask the odor of food, tobacco or medicine. Once the candy is fully dissolved, however, breath protection often drops off considerable. Within a few minutes, bad odor can again be perceived emanating from the mouth. Chewing gums have been utilized to afford longer range freshening, but typically the active breath protection ingredient is masticated away rather quickly from the gum.

Several substances have now established roles as breath fresheners in the chewing gum and confectionery industries. These include many metallic ions, as well as organic substances such as the oil derived from cardamon seeds. For example, U.S. Pat. No. 4,626,427 is directed to a cardamon seed preparation which is effective against bad breath. Mushroom extract as an active agent is discussed in U.S. Pat. No. 5,639,470. In U.S. Pat. No. 4,689,214 a combination of zinc ions and ionone/ketone terpene derivatives is set forth. Terpene compounds are also set forth in U.S. Pat. No. 4,814,163. German Patent documents 3,610,179 and 3,733,742 are also directed to breath freshening formulations. Many of these substances concentrate their action in the stomach by neutralizing or masking foul-smelling sulfur compounds.

Unfortunately, many of the substances recognized as breath stabilizers are also relatively volatile and therefore present storage stability problems in such delivery mechanisms as chewing gum. In addition, many breath fresheners react quite readily with one another, thereby reducing their overall breath-freshening capacity rather quickly over time. It is this neutralization problem, as well as the aforesaid volatilization of the actives upon exposure to ambient conditions, that has heretofore inhibited the development of a truly long-lasting breath-protection gum product.

Certain references, such as U.S. Pat. Nos. 5,549,917 and 5,556,652, are directed to formulations which seek to encapsulate certain ingredients for use in chewing gums. However, these references fail to suggest a number of encapsulations which would be particularly effective as breath fresheners. Moreover, there appears to be no teaching as to how the skilled artisan could combine rather disparate groups of breath freshening substances into a single chewing gum, while maintaining their effectiveness. In addition, these references evince little or no recognition of the enhanced effect certain encapsulations, as well as combinations thereof, can have on the breath freshening capability of a chewing gum composition.

What is therefore needed in the art is an improved chewing gum for breath freshening which affords the user both instant and long-range breath protection, even after the gum is removed from the mouth. Also needed are breath-freshening encapsulations which can be incorporated into gums, candies and mints etc. to afford enhanced breath protection from both the mouth and the stomach. Additionally, new formulations which can be incorporated in the aforesaid encapsulations are also needed for use in a breath-freshening gum product and other delivery vehicles.

SUMMARY OF THE INVENTION

The present invention provides a chewing gum composition for instant and extended release breath freshening. The chewing gum composition has a gum base which is masticated by the user. Combined with the gum base are at least one wetting agent and at least one immediate release flavor ingredient. The immediate release flavor ingredient initiates the breath freshening action in the mouth and its effect is quickly sensed by the user. In a preferred embodiment, the chewing gum composition also includes at least one material selected from the group consisting of emulsifiers. Also included in the chewing gum composition is at least one encapsulation selected from the group consisting of flavor encapsulations, metallic ion encapsulations, and organic substance encapsulations. As hereinafter described, these encapsulations provide for longer range protection from malodorous substances in both the mouth and the stomach.

Also provided as part of the invention are various encapsulations which can deliver breath protection in a wide range of carriers, including candy, gum and mints.

It has now been discovered that breath freshening flavors and ingredients can be made to remain fairly dormant and thus storage stable in a chewing gum composition until released via mastication by the consumer. By means of a unique system of encapsulation a multitude of these substances may be combined into a gum base. The encapsulation is so pervasive and extensive that continued chewing action by the user over a substantial period of time is required to "burst" or release all the active breath protection ingredients from the gum matrix. Thus, these ingredients can be delivered in a controlled mode over an extended period. In addition, by encapsulating the active breath freshening substances, their taste can be masked and their unintended neutralization as a result of undesirable interaction with one another can also be significantly reduced. Encapsulation of both flavors and active substances furthermore permits their entry into the stomach (via swallowing) to initiate secondary breath protection, thereby contributing to longer range breath freshening as sulfur compounds in the gut are neutralized. In this way, encapsulation allows for breath freshening over a substantially longer period of time than has been typically achieved in the art. Moreover, as the active substances of the composition of the invention are released into the stomach their neutralization of various malodorous sulfur compounds helps to reduce odor which would otherwise emanate from the pores of an individual. Overall body odor is thereby reduced as well.

DETAINED DESCRIPTION OF THE PREFERRED EMBODIMENTS

Figure 1:
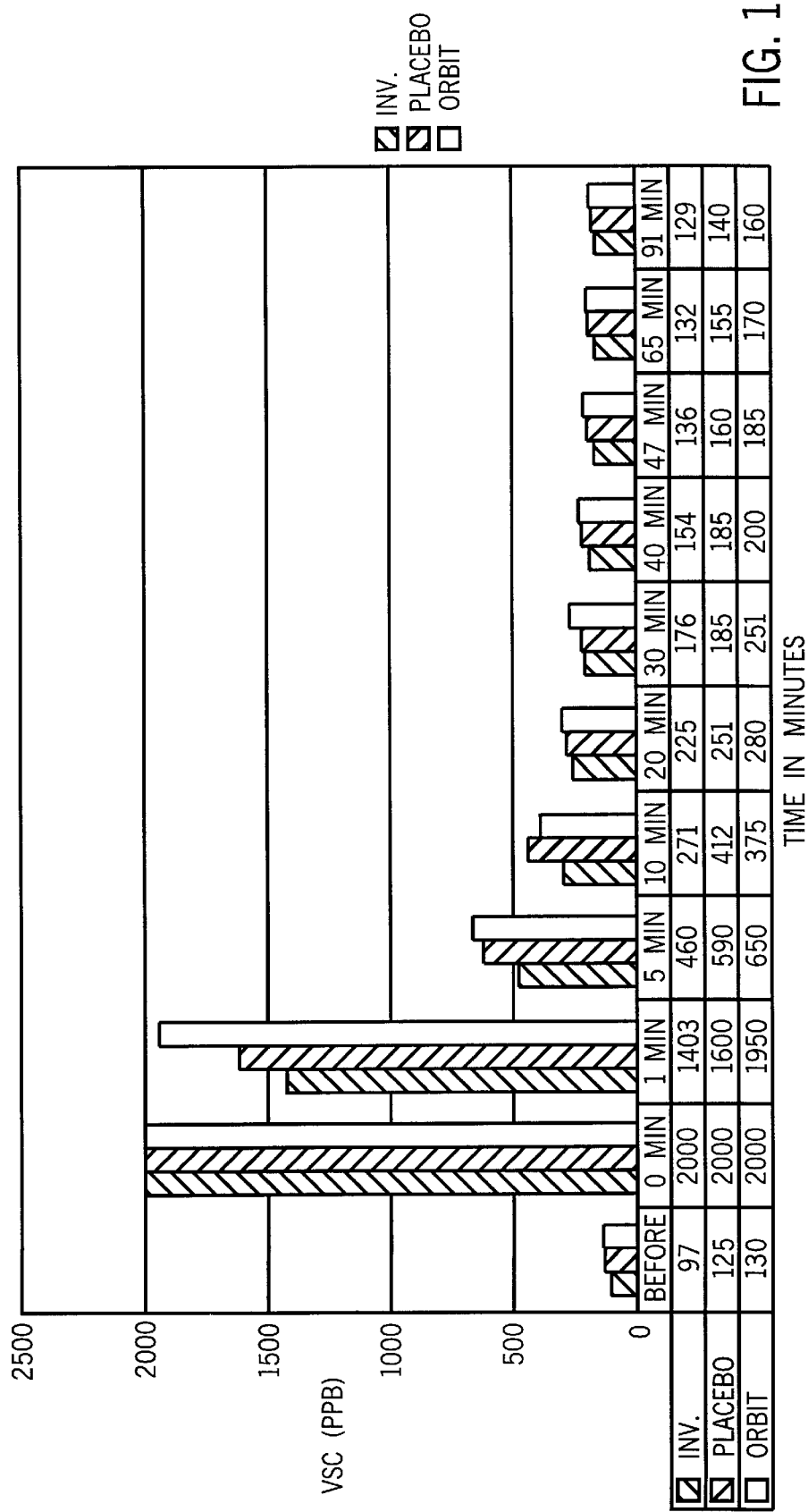
FIG. 1 is a graph comparing the effect of various breath freshening formulations on the amount of Volatile Sulfur Compounds in parts per billion after X minutes.

Breath protection technology has now necessitated the development of a composition and product which affords both instantaneous and enhanced breath freshening over time.

The chewing gum composition of the invention comprises a chewing gum base which is taken orally and masticated by the consumer. The gum base can be any substantially water-insoluble substance typically utilized in established chewing gum preparations. For example, suitable polymers can include both natural and synthetic elastomers and rubbers, and combinations thereof. These can be chosen from the list of substances of vegetable origin, such as chicle, jelutong, gutta percha and crown gum. Synthetic elastomers such as butadiene-styrene copolymers, polyethylene, polyisobutylene, polyisoprene, isobutylene-isoprene copolymer, polyvinylacetate, as well as any combination of any of the foregoing substances.

The chewing gum base may be present in the composition of the invention in amounts of from about 5 to 85% (unless otherwise specified, all percentages herein are weight percentages based on the total weight of the composition). More typically, the gum base will make up from about 15 to 30% of the formulation, with about 20 to 25% being more preferred.

In addition, the gum base may contain elastomer solvents to aid in softening the "rubber" component. These can comprise anywhere from about 10 to 75%, and usually from about 45 to 70% of the chewing gum base. Non-limiting examples of such solvents include many esters of rosins or modified rosins. Also, certain plasticizers or softeners may also be present in the gum base. These are typically compounds utilized in the art, and are well known to the skilled artisan. They include lanolin and many natural waxes. When present, these compounds will comprise up to about 10–15% of the gum base, and more preferably will be within the range of about 3 to 10% thereof. The foregoing percentages may vary according to the mouth-feel characteristics sought by the skilled artisan.

The chewing gum composition also contains at least one wetting agent. The term "wetting agent" refers to a substance which aids the user in moistening the chewing gum for mastication. These wetting agents may be chosen from the non-exhaustive listing of polyols, including sugar alcohols such as sorbitol, sorbitol syrup, xylitol, mannitol and the like. Other highly suitable wetting agents include glycerin and glycerol. Lycasin is also especially preferred. Preferably, a combination of more than one of the foregoing is utilized as the wetting component of the chewing gum formulation. Highly desirable is a combination of sorbitol, glycerin and lycasin. One or a combination of the foregoing wetting agents will comprise about 30 to 85% of the chewing gum composition, and more desirably be within the range of about 40 to 75% of the composition. It is especially preferred that the wetting agent(s) make up from about 50 to 75% of the chewing gum composition.

It is preferable to also include as part of the chewing gum formulation of the invention at least one member selected from the group consisting of emulsifiers. Lecithin is a preferred emulsifier, but other phospholipid material, as well as monoglycerides and/or diglycerides, and mixtures thereof may be utilized. Other examples of suitable emulsifiers would include glycerol momostearate, glycerol triacetate, and propylene glycol monostearate. The emulsifier(s) may be added in amounts from about 0 to 5% of the chewing gum composition, more preferably from about 0.01 to 1% thereof The chewing gum composition also contains at least one immediate release flavor component. As that term is used herein, "immediate release" refers to the release of flavor upon initial mastication of the chewing gum composition. This release of flavor is quickly sensed by the user. The immediate release flavor component is therefore particularly efficacious in initiating the breath freshening activity of the gum composition by masking, neutralizing or even eliminating malodors rather quickly in the mouth.

This flavor component of the invention is selected from the group of natural and artificial flavorings and sweeteners normally utilized in the chewing gum industry, as well as any combination thereof. Such sweeteners would include, for example without limitation, sucrose, glucose, dextrose, invert sugar, fructose, saccharin and its various salts, aspartame, sucralose, sorbitol, mannitol, xylitol, hydrogenated starch hydrolysate, acesulfame K, dihydrochalcone compounds, glycyrrhizin, Stevia Rebaudiana (Stevioside) and the like. Preferably, the sweeteners comprising the flavor component are "sugarless", with aspartame and acesulfame K (3,6-dihydro-6-methyl-1-1-1,2,3-oxathiazin-4-one-2,2-dioxide) being particularly preferred. Flavorings may be chosen from natural and synthetic flavoring liquids normally utilized in the food industry. An illustrative listing of such agents would include volatile oils, synthetic flavor oils, flavoring aromatics, oils, liquids, oleoresins, or extracts derived from plants, herbs, leaves, flowers, fruits, berries, stems and combinations thereof. Fruit oils, essences, aldehydes and esters are contemplated, as are those flavorings typically noted for their breath freshening capabilities which provide a "cooling" or "fresh" sensation, such as peppermint, wintergreen, spearmint, menthol, menthone and the like. Of these, peppermint, spearmint and menthol may be particularly preferred. The foregoing flavorings and sweeteners which make up the immediate release flavor component will be present in amounts equal to about 0.01 to 40%, more preferably within the range of about 0.01 to 5%, and even more desirably within about 0.01 to 3% of the chewing gum composition of the invention.

Also included in the chewing gum composition of the invention is at least one encapsulation. The encapsulation may be selected from the group consisting of flavor encapsulations, metallic ion encapsulations, and organic substance encapsulations. Preferably, the composition will contain at least two, and desirably all three of the foregoing encapsulations. Other breath-freshening encapsulations developed by the skilled artisan are also within the scope of the invention. The encapsulation(s) will typically be present in total amounts of from 0.01 to 20% of the chewing gum composition, and more preferably within the range of about 0.1 to 5%. It is even more preferred that the chewing gum composition contain about 0.5 to 5% by total weight of encapsulation(s). Those skilled in the art will realize that adjustments to the foregoing percentages (as well as to all % ranges provided hereunder) may be effected for maximum optimization of the invention's teachings.

The flavor encapsulation contains one or more of the natural and artificial flavorings and sweeteners noted heretofore as useful for the immediate release flavor component. The flavoring may desirably be of "mint" origin, such as peppermint, spearmint, or wintergreen, and may also include menthol or menthone, including combinations thereof. Preferably, the sweetener is "sugarless" such as acesulfame K or aspartame, either alone or more preferably in combination. These flavoring and sweeteners together will comprise from about 0.01 to 65% of the flavor encapsulation, more preferably about 0.1 to 35%, and even more preferably will constitute about 5 to 35% of the flavor encapsulation.

As part of the flavor encapsulation is an encapsulating agent. The encapsulating agent essentially surrounds and enrobes the active ingredients, i.e. the flavorings and/or sweeteners, which comprise part of the flavor encapsulation. The encapsulating agent moreover protects these actives from premature volatilization and interaction with other active ingredients contained within the chewing gum composition. The encapsulating agent may be one or more substances selected from the group consisting of emulsifiers (in addition to the emulsifier heretofore noted as a separate ingredient), oleaginous substances, fats and oils normally utilized in the food and confectionery industries. The emulsifier may be chosen from the listing provided heretofore. The fats and oils may be derived from the non-limiting listing of such fatty acids as stearic acid (stearine being highly preferred), palmitic acid, and oleic acid, as well as any combination of any of these. Fatty acid triglycerides are also contemplated, with medium chain triglycerides being highly desirable (those having a C6–C12 carbon chain). A combination of medium chain triglyceride and stearine is particularly desirable. The encapsulating agent will make up from about 0.1 to 85% of the flavor encapsulation. More preferably, the flavor encapsulation will contain about 5 to 75% of encapsulating agent, and even more desirably about 40 to 75% thereof.

An optional component of the flavor encapsulation is an absorbent material. The absorbent material assists in the absorption of malodorous substances from the mouth and gut. An especially preferred absorbent material is hydroxypropylmethylcellulose (HPMC), but the absorbent material can also comprise one or more other substances known in the art with sulfur absorbing prowess, as well as any combinatin thereof. For example, other cellulosic materials selected from the group consisting of alkyl celluloses, hydroxyalkyl celluloses and hydrosyalkylalkyl celluloses are contemplated. The absorbent material will comprise about 0 to 25% of the flavor encapsulation, and more desirably be within the range of about 5 to 15% thereof.

A second encapsulation which can be included as part of the chewing gum composition of the invention will be a metallic ion encapsulation. This encapsulation will contain one or more metallic ions which assist the user in the breath freshening cycle. Those metallic ions recognized in the industry may be utilized in whatever form with their suitable salts, including for example, zinc and copper ions. Combinations of breath freshening metallic ions may be particularly preferred. Of these, a combination of zinc gluconate, sodium copper chlorophyllin, and copper gluconate may be especially desirable. The metallic ion(s) will make up about 0.01 to 10% of the metallic ion encapsulation. Preferably, the metallic ion encapsulation will contain 0.1 to 3% of metallic ion(s), and more preferably about 0.1 to 2% of metallic ion(s).

The metallic ion encapsulation, like the heretofore described flavor encapsulation, will also contain an encapsulating agent selected from the group consisting of emulsifiers, oleaginous substances, fats and oils normally utilized in the food and confectionery industries. A broad listing of suitable emulsifiers, fats and oils has been set forth above as the encapsulating agent. For the metallic ion encapsulation, the encapsulating agent may be identical to, substantially similar to, or may be different from the encapsulating agent utilized as part of the flavor encapsulation. In at least one embodiment of the metallic ion encapsulation, the encapsulating agent is preferably stearine in combination with Durem 117, a fatty substance. The encapsulating agent will make up from about 0.1 to 85% of the metallic ion encapsulation. More preferably, the metallic ion encapsulation will contain about 5 to 75% of encapsulating agent, and even more desirably about 40 to 75% thereof.

In addition, the metallic ion encapsulation will preferably have some type of wetting agent present (in addition to the wetting agent heretofore noted as a separate ingredient) which is chosen from the listing heretofore provided as wetting agents. Of these, sorbitol is particularly preferred. The wetting agent as part of the metallic ion encapsulation will comprise about 0.1 to 50% thereof, more preferably about 5 to 40% thereof.

A third encapsulation as part of the chewing gum composition of the invention will be an organic substance encapsulation. The organic substance encapsulation will comprise actives which are useful in breath freshening, and which themselves are organically derived. Without being bound by theory, it appears that the organic substances absorb and neutralize malodorous sulfur-based compounds both intrinsically, that is, in the stomach, and extrinsically, in the mouth. Derivatives of various plants and herbs are useful in this regard, as are what is termed in the art "essential oils". Those ingredients with useful amounts of terpene compounds (oxidation products of Beta-carotene) have been noted to be especially effective in combating malodor. Other absorbent material which is synthetically derived may also be utilized. Non-limiting examples of organic substances useful in the organic encapsulation, either alone or in combination, include the following: plant and herb material such as mushroom, parsley seed and cardamon oil, cardamon seed oil and sunflower oil, as well as hydroxypropylmethylcellulose. Anethole (NF Extra) and alpha-ionone are also especially useful. These organic substance(s) will comprise from about 0.1 to 50% of the organic encapsulation. In a preferred embodiment, the organic encapsulation will contain about 5 to 40% of organic, breath freshening substances, more desirably from about 10 to 30% of these substances.

The organic substance encapsulation will also contain at least one component selected from the group consisting of emulsifiers, oleaginous substances, fats and oils as an encapsulating agent. The emulsifiers, fats and oils useful as the encapsulating agent have been set forth in regard to the heretofore described encapsulating agents of flavor encapsulation and the metallic ion encapsulation. Preferably, the encapsulating agent of the organic substance encapsulation is a combination of stearine and medium chain triglyceride oil. The encapsulating agent will make up from about 0.1 to 85% of the organic substance encapsulation. More preferably, the organic substance encapsulation will contain about 5 to 75% of encapsulating agent, and even more desirably about 40 to 75% thereof.

A flavoring component will also preferably be present in the organic substance encapsulation. The flavoring component will be selected from the listing of natural and synthetically derived flavorings and sweeteners heretofore set forth for the immediate release flavor component as part of the chewing gum composition. A combination of peppermint, menthol or menthone and herbaflox seasoning may be especially preferred as the flavoring component. The flavoring component will comprise about 0 to 10% of the organic substance encapsulation, more preferably about 1 to 8%.

There may also be included in the organic substance encapsulation an absorbent material which can be the same as or similar to the absorbent material as part of the flavor encapsulation. The absorbent material will comprise about 0 to 25% of the organic substance encapsulation, and more desirably be within the range of about 5 to 15% thereof.

The foregoing organic substance encapsulation, as well as the metallic ion and flavor encapsulation, may be prepared by methods available to the skilled artisan. For example, traditional methods such as spray-drying and extrusion techniques may be employed. Simple mixing methods with industrial scale mixing equipment (Hobart mixer) may also be utilized. Other methods include the processes of flash-flow mixing, in particular flash heat and flash shear developed by Fuisz Technologies Ltd. of Chantilly, Va., which are detailed in, for example, U.S. Pat. Nos. 5,549,917 and 5,556,652. Any combination of any of the foregoing methods may also be contemplated in the formation of the encapsulations herein described.

A sample procedure for formulating the chewing gum composition of the invention is as follows: the gum base is first melted at approximately 55 degrees C. One or more wetting agents are than added to the gum base. Alternatively, the wetting agents may be mixed with one another, and then added to the gum base. Any emulsifier is also mixed with the gum base, followed by the ingredients making up the immediate release flavor component. One or more of the encapsulations are then added to the thus obtained mixture, and all ingredients are mixed for a period of time (in one embodiment, about 2–5 minutes) to ensure adequate dispersion. The mixture is then allowed to cool and is cut into suitable serving sizes, for example 2.8 gram sticks, which is approximately the standard commercial size of a "stick" of chewing gum. Other methods for preparing the chewing gum composition are also contemplated herein, and are within the scope of the invention. For example, flash flow processing and spray drying may also be utilized.

Those skilled in the art will quickly appreciate that any of the encapsulations may be utilized in other than a chewing gum composition. For example, addition of the described encapsulation(s) to a hard or soft edible confectionery base is also within the scope of the invention. Any one of the listed encapsulations may be combined as a component thereof, in a manner as would other substantive ingredients, as for example, by thorough mixing therein.

It is now been discovered that the chewing gum composition of the invention exhibits excellent short term and longer range breath protection. It is within the scope of the invention to have breath freshening last for up to about 90 minutes of more, more preferably about 2 hours or more, and in certain embodiments up to about 4 hours or longer after breath freshening is initiated. The immediate release flavor component initiates the breath freshening, while the encapsulation(s) are masticated over a prolonged period (up to about 30 minutes before removal of the gum from the mouth) and delivered to the intestinal tract where they are released to mask, neutralize and/or eliminate sulfur-containing compounds responsible for bad breath, and other undesirable body odor.

Encapsulation helps to ensure that the active ingredients contained therein do not prematurely neutralize one another prior to their activation as a result of chewing action by the consumer. Thus, the skilled artisan may conceive of a myriad of various breath freshening encapsulations to be utilized in chewing gums and other confectionery preparations. The encapsulating vehicles herein described will maintain the active ingredients contained therein in a form highly suitable for delivery.

The following examples illustrate various embodiments of the invention, and should not be construed as limiting the scope thereof.

EXAMPLE 1

This example illustrates a chewing gum composition containing three encapsulations according to a preferred embodiment of the invention (based on weight percentages):

| Ingredients | Gum | Flavor Encap. | Metallic Ion Encap | Organic Encap. |
|---|---|---|---|---|
| Gum Base | 24 | | | |
| Sorbitol 60W | 58.56 | | 28.60 | |
| Glycerin 99% | 4 | | | |
| Lycasin 85% | 8 | | | |
| Zinc gluconate | | | 0.1–1.0 | |
| Sodium copper chlorophyllin | | | 0.1–1.0 | |
| Copper Gluconate | | | 0.1–1.0 | |
| α-ionone | | | | |
| Cardamon oil | | | | |
| Anethole NF Extra | | | | |
| Parsley Seed Oil | | | | 25–30 |
| Sunflower Oil | | | | |
| Mushroom Powder | | | | |
| Lecithin 3FUB | 0.5 | | | |
| Stearine D-17 | | | | |
| Durem 117 | | 55–70 | 55–70 | 55–70 |
| MCT Oil | | | | |

-continued

| Ingredients | Gum | Flavor Encap. | Metallic Ion Encap | Organic Encap. |
|---|---|---|---|---|
| Aspartame | 0.14 | 6 | | |
| Acesulfame K | | 4 | | |
| First Flavor | 1 | 15 | | 5 |
| Herbaflox Seasoning | | 0.1 | | 0.1 |
| Menthol Spray Dry | 0.4 | | | |
| HPMC | | 10 | | 8 |
| Flavor Encaps. | 2 | | | |
| Metallic Ion Encaps. | 0.4 | | | |
| Organic Encaps. | 1 | | | |
| TOTAL | 100 | 100 | 100 | 100 |

The foregoing composition and encapsulations were then utilized for Examples 2–4.

EXAMPLE 2

In this example, a clinical trial was conducted to measure the sulfur content in the breath of various individuals over time after consuming 0.35 grams of garlic and then chewing a gum composition for 30 minutes. The placebo was a gum base with no flavor, ORBIT® was a commercially available stick preparation, and the Inv. was a 2.8 gram piece of a preferred formulation of the present invention. The results are indicated in FIG. 1.

EXAMPLE 3

Figure 2:
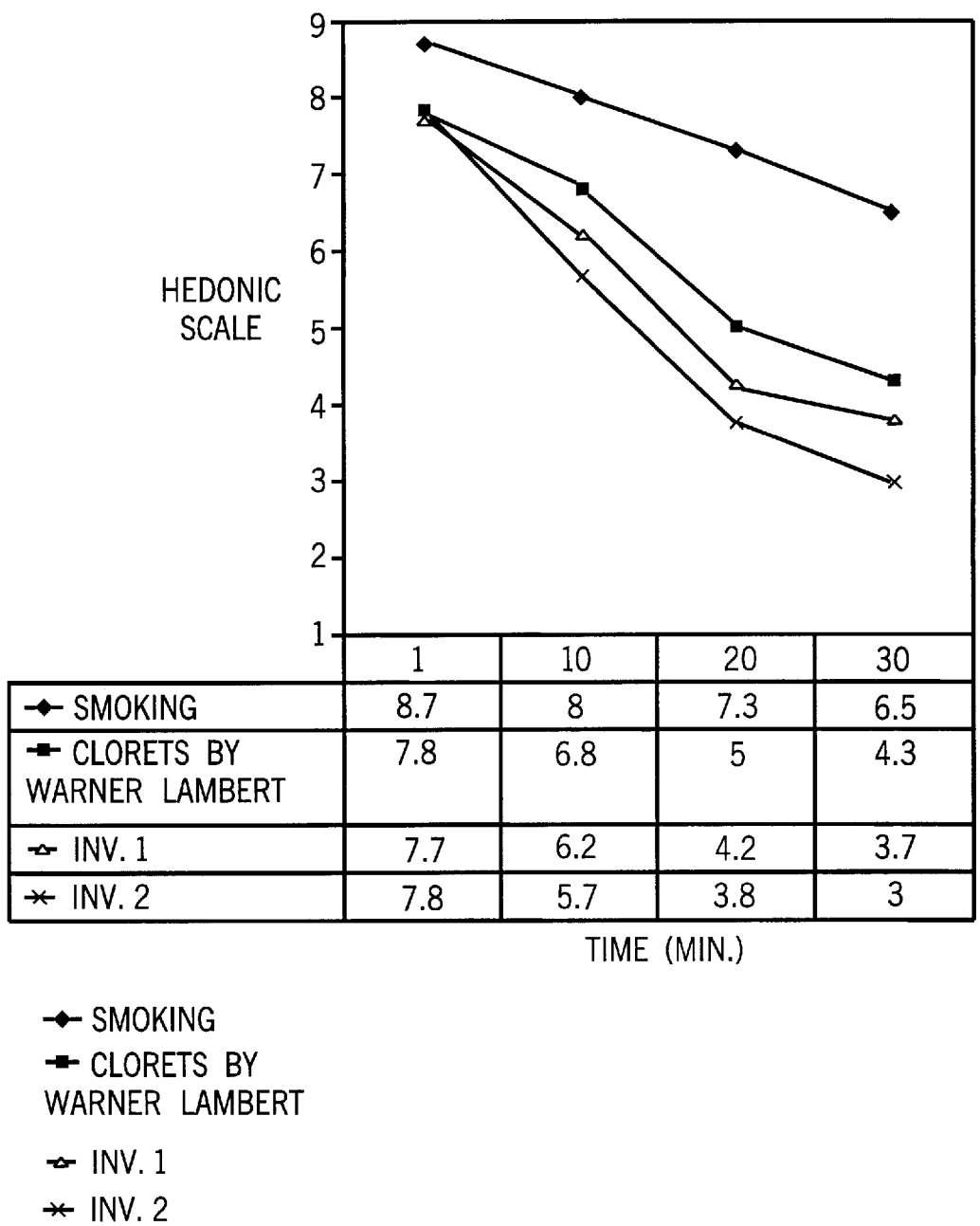
FIG. 2 is a graph comparing the effect of various breath freshening formulations on the perceived odor of smoking breath after X minutes.

In this example, the breath of smokers was rated subjectively (organoleptically) by test subjects according to the degree of malodor (1=no malodor; 9=strong malodor). The smokers each smoked a cigarette and then chewed a 2.8 gram piece of chewing gum (in the placebo group, certain smokers did not chew any gum). Subjects and judges were separated by a cardboard wall through which a plastic straw was inserted. Subjects were asked to blow through the straw so that judges could rate their breath. CLORETS® is a product of the Warner Lambert Co. Inv. 1 and Inv. 2 indicate two preferred embodiments of the chewing gum composition of the invention. The results are indicated in FIG. 2.

EXAMPLE 4

Figure 3:
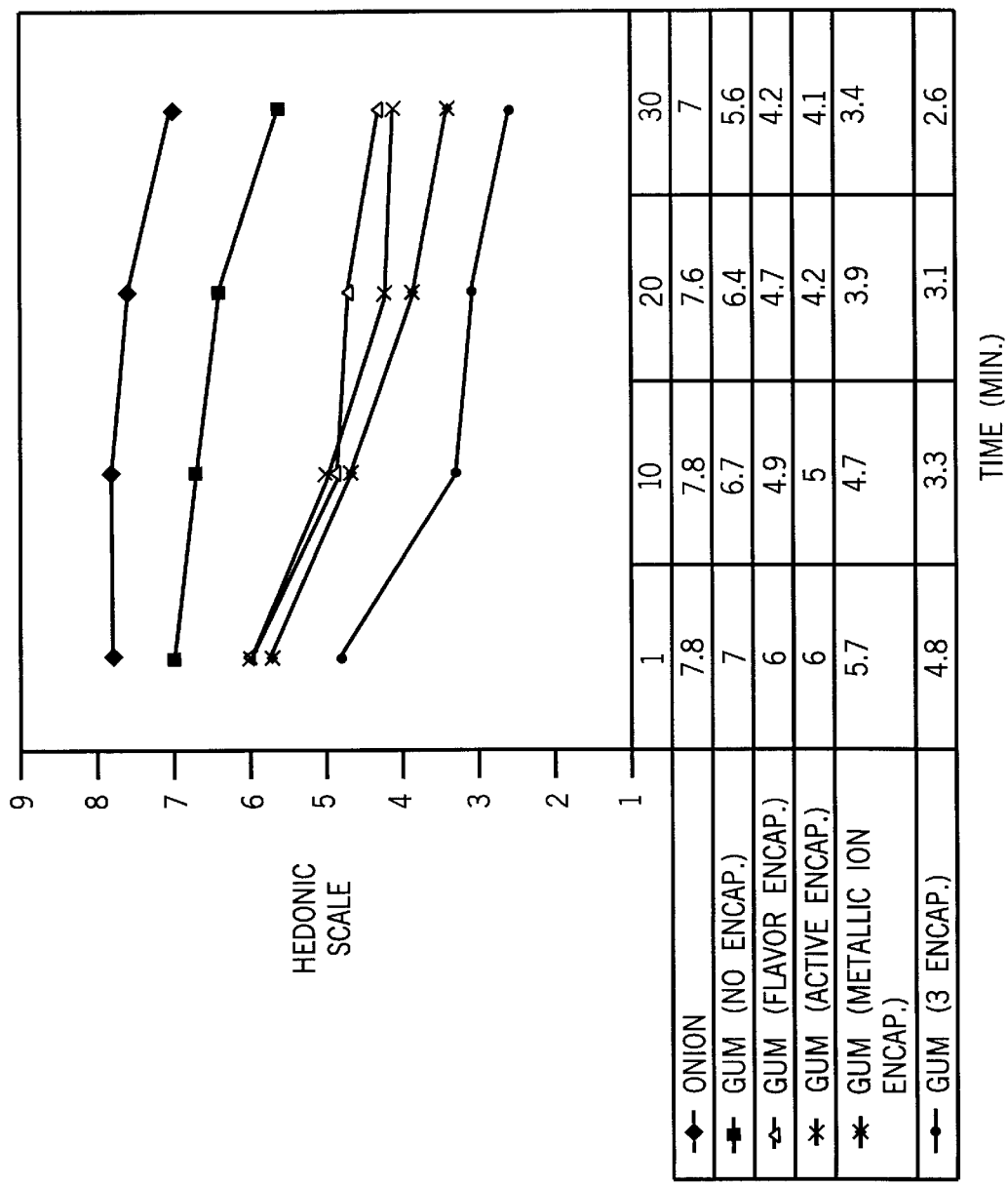
FIG. 3 is a graph comparing the effect of various breath freshening formulations on the perceived odor of onion breath after X minutes.

For this example the protocol was the same as in Example 3, except that subjects consumed 5 grams of onion chips prior to having their breath rated. A 2.8 gram piece of five chewing gums were rated: No. 1 had gum base, a bulk sweetener and plasticizers, with additional flavor compounds incorporated therein in an unencapsulated form. No. 2 was the same as No. 1, with an additional flavor encapsulation according to one preferred embodiment of the invention. No. 3 was the same as No. 1, with an additional organic substance encapsulation according to one preferred embodiment of the invention. No. 4 was the same as No. 1, with an additional metallic ion encapsulation according to one preferred embodiment of the invention. No. 5 was the same as No. 1, with each of the encapsulations from No.s 2, 3 and 4 incorporated therein. The results are shown in FIG. 3.

As the foregoing Examples illustrate, the chewing gum composition of the invention has been demonstrated to be an effective breath-freshening product. Moreover, the encapsulations herein described have furthermore been shown to significantly enhance the ability of the underlying chewing gum carrier to effectively mask, neutralize or eliminate otherwise discernible malodorous compounds.

While the invention has been described in each of its various embodiments, it is to be expected that certain modifications thereto may be effected by those skilled in the art without departing from the true spirit and scope of the invention as set forth in the specification and the accompanying claims.

What is claimed is:

1. A chewing gum composition for instant and extended release breath freshening, comprising:
   a. gum base;
   b. at least one wetting agent;
   c. at least one immediate release flavor ingredient;
   d. a first oleaginous encapsulant containing one or more organic substances; and
   e. a second oleaginous encapsulant containing one or more metallic ions.

2. The composition as claimed in claim 1, wherein said wetting agent is selected from the group consisting of sorbitol, glycerine and lycasin.

3. The composition as claimed in claim 1, further comprising at least one member selected from the group consisting of emulsifiers.

4. The composition as claimed in claim 1, wherein said immediate release flavor ingredient is selected from the group consisting of natural and artificial sweeteners and flavorings.

5. The composition as claimed in claim 1, wherein said flavor encapsulation comprises at least one encapsulating agent, at least one flavoring agent and at least one absorbent.

6. The composition as claimed in claim 1, wherein said metallic ion encapsulation comprises at least one breath freshening metallic ion and at least one encapsulating agent.

7. The composition as claimed in claim 1, further comprising a third oleaginous encapsulant containing one or more flavors.

8. The composition as claimed in claim 1, wherein said metallic ion oleaginous encapsulant comprises a mixture of zinc and copper ions.

9. The composition as claimed in claim 8, wherein said organic substance oleaginous encapsulant comprises at least one member selected from the group consisting of terpene compounds, plant and herb material.

10. The composition as claimed in claim 9, wherein said organic substance oleaginous encapsulant comprises at least two members selected from the group consisting of alpha-ionone, cardamon oil, anethole, parsley seed, sunflower oil and mushroom powder.

11. The composition as claimed in claim 10, wherein said organic oleaginous encapsulant comprises a combination of alpha-ionone, cardamon oil, anethole, parsley seed, sunflower oil and mushroom powder.

12. The composition as claimed in claim 11, wherein said metallic ions comprise about 0.1 to 10% of said metallic ion oleaginous encapsulant, and said organic substances comprise about 10 to 30% of said organic substance oleaginous encapsulant; and further wherein said encapsulants comprise about 0.1 to 5% of said chewing gum composition.

13. The composition as claimed in claim 8, further comprising a third oleaginous encapsulant containing one or more flavors.

14. The composition as claimed in claim 13, wherein said flavor oleaginous encapsulant comprises at least one member having a mint origin.

15. The composition as claimed in claim 14, wherein said mint origin comprises peppermint, spearmint, wintergreen, and said flavor oleaginous encapsulant further comprises menthol, and combinations thereof.

16. The composition as claimed in claim 15, wherein said metallic ions comprise about 0.1 to 10% of said metallic ion oleaginous encapsulant, and said flavor substances comprise about 5 to 35% of said flavor oleaginous encapsulant; and further wherein said encapsulants comprise about 0.1 to 5% of said chewing gum composition.

17. The composition as claimed in claim 7, wherein said flavor oleaginous encapsulant comprises at least one member selected from the group consisting of spearmint, peppermint, wintergreen and menthol; said metallic ion oleaginous encapsulant comprises at least one member selected from the group consisting of copper and zinc ions; said organic substance oleaginous encapsulant comprises at least member selected from the group consisting of terpenes and plant and herb extracts.

18. The composition as claimed in claim 17, wherein said encapsulants comprise about 0.1 to 5% of said chewing gum composition, and further wherein said metallic ion oleaginous encapsulant comprises a mixture of copper and zinc ions, said organic substance oleaginous encapsulant comprises at least two members selected from the group consisting of alpha-ionone, cardamon oil, anethole, parsley seed, sunflower oil and mushroom powder.

19. The composition as claimed in claim 18, wherein said flavor oleaginous encapsulant comprises menthol and said organic substance oleaginous encapsulant comprises a mixture of alpha-ionone, cardamon oil, anethole, parsley seed, sunflower oil and mushroom powder.

20. The composition as claimed in claim 18, wherein said chewing gum composition is effective at neutralizing odors emanating from the mouth, pores, and stomach of an individual.

21. The composition as claimed in claim 19, wherein said chewing gum composition is effective at neutralizing odors emanating from the mouth, pores, and stomach of an individual.

22. The composition as claimed in claim 20, wherein said composition is effective for up to about 90 minutes.

23. The composition as claimed in claim 21, wherein said composition is effective for up to about 90 minutes.

24. The composition as claimed in claim 22, wherein said composition is effective for up to about 2 hours.

25. The composition as claimed in claim 23, wherein said composition is effective for up to about 2 hours.

\* \* \* \* \*